United States Patent
Taggart et al.

(10) Patent No.: US 9,626,770 B2
(45) Date of Patent: Apr. 18, 2017

(54) GENERATING SYNTHETIC VIDEO FRAMES USING OPTICAL FLOW

(71) Applicant: Apple Inc., Cupertino, CA (US)

(72) Inventors: Angus M. Taggart, San Diego, CA (US); Eric S. Beale, Santa Monica, CA (US)

(73) Assignee: APPLE INC., Cupertino, CA (US)

( * ) Notice: Subject to any disclaimer, the term of this patent is extended or adjusted under 35 U.S.C. 154(b) by 45 days.

(21) Appl. No.: 14/683,646

(22) Filed: Apr. 10, 2015

(65) Prior Publication Data

US 2016/0301881 A1 Oct. 13, 2016

(51) Int. Cl.
| | | |
|---|---|---|
| *G06K 9/00* | (2006.01) | |
| *G06T 7/20* | (2017.01) | |
| *G06K 9/36* | (2006.01) | |
| *G06T 5/50* | (2006.01) | |
| *H04N 5/14* | (2006.01) | |
| *H04N 11/02* | (2006.01) | |

(52) U.S. Cl.
CPC ........ *G06T 7/2073* (2013.01); *G06K 9/00711* (2013.01); *G06K 9/36* (2013.01); *G06T 5/50* (2013.01); *H04N 5/144* (2013.01)

(58) Field of Classification Search
USPC ........ 382/100, 103, 106–107, 154, 162–168, 382/173, 181, 199, 209, 224, 232, 243, 382/254, 266, 274, 276, 286–291, 305, 382/312, 321; 375/240.12; 345/419; 348/745; 398/130
See application file for complete search history.

(56) References Cited

U.S. PATENT DOCUMENTS

| | | | | |
|---|---|---|---|---|
| 2002/0063807 | A1* | 5/2002 | Margulis | G06T 1/20 348/745 |
| 2004/0252759 | A1* | 12/2004 | John Winder | H04N 5/145 375/240.12 |
| 2005/0286759 | A1* | 12/2005 | Zitnick, III | G06T 7/0077 382/154 |
| 2013/0187910 | A1* | 7/2013 | Raymond | G09G 5/14 345/419 |
| 2015/0050027 | A1* | 2/2015 | Oshima | H04B 10/541 398/130 |

* cited by examiner

*Primary Examiner* — Seyed Azarian
(74) *Attorney, Agent, or Firm* — Adeli LLP

(57) ABSTRACT

A novel method of using optical flow algorithm that maximizes the benefit of optical flow synthetic frames while minimizing the associated computation cost is provided. When using optical flow to produce synthetic frames between two actual/recorded frames, the method computes a set of estimates of optical flows (or a flow estimate) between the two frames. These flow estimates are then used to compute all synthetic frames that are needed between the two actual frames by interpolation, which creates each synthetic frame based on its temporal distances from the pair of actual frames.

21 Claims, 11 Drawing Sheets

GENERATING SYNTHETIC VIDEO FRAMES USING OPTICAL FLOW

BACKGROUND

Optical flow is a numerical technique that attempts to model the motion, or the "flow" of pixels between consecutive recorded video frames. It enables the creation of synthetic video frames at times in-between recorded video frames. One of the primary applications of optical flow is for retiming video content, which is used by media editing applications or computer games for creating visual effects. Retiming video content changes the timing of its playback such that synthetic video frames are needed in addition to the actual recorded frames for smooth playback under the changed playback timing.

SUMMARY

Some embodiments of the invention provide a novel method and apparatus of using optical flow algorithm that maximizes the benefit of optical flow synthetic frames while minimizing the associated computation cost. When using optical flow to produce synthetic frames between two actual/recorded frames, some embodiments compute a set of estimates of optical flows (or flow estimates) between the two frames. These flow estimates are then used to compute all synthetic frames that are needed between the two actual frames by interpolation, which creates each synthetic frame based on its temporal distances from the pair of actual frames.

Some embodiments compute only a limited set of estimated flows between the actual frames while using interpolation to create all of the frames necessary for playback from the limited set of estimated flows. Some embodiments compute only up to a fixed number of flow estimates per consecutive actual frame pair. This fixed number is determined in some embodiments by the availability and the capability of the computing resources. If the media playback requires more synthetic frames between the two actual frames than the fixed number, the method would not compute any more flow estimates but rather rely on interpolation to create the needed synthetic frames. Some embodiments perform interpolation on the computed flow estimates in order to generate interpolated flow estimates. Some embodiments compute interpolated flow estimates for each of the required timing instants and then generate the synthetic frames from the interpolated flow estimates.

Some embodiments detect events in a video sequence that causes such distortions and switch off optical flow based frame interpolation. Some embodiments detect sudden changes in light intensity and switch to non-optical flow based frame interpolation when such sudden change is detected. When there is no such drastic change in light intensity, the system reverts back to using optical flow frame interpolation. Specifically, some embodiments detect a flash event by computing a sum of differences in histograms of intensity levels between the pair of consecutive actual video frames. When the sum of differences is above a certain threshold, the video system switch to non-optical flow based frame interpolation. When the sum of differences is below the threshold, the video system reverts back to optical flow frame interpolation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Synthesized frames created by optical flows generally resemble actual recorded frames much more so than those created by other methods (such as frame blending). Consequently, retimed video sequences that use optical flow to create the in-between frames are visually smoother than those that use other methods. However, optical flow is a computation intensive algorithm. Some embodiments of the invention therefore provide a novel method and apparatus of using optical flow algorithm that maximizes the benefit of optical flow synthetic frames while minimizing the associated computation cost.

I. Generating Synthetic Frames from Optical Flow

When using optical flow to produce synthetic frames between two actual/recorded frames, some embodiments compute an estimate of optical flow (or a flow estimate) between the two frames. This flow estimate is then used to compute all synthetic frames that are needed between the two actual frames by interpolation, which creates each synthetic frame based on its temporal distances from the pair of actual frames. For some embodiments, FIG. 1 illustrates using one optical flow estimate between actual frames to create synthesized frames by interpolation.

Figure 1:
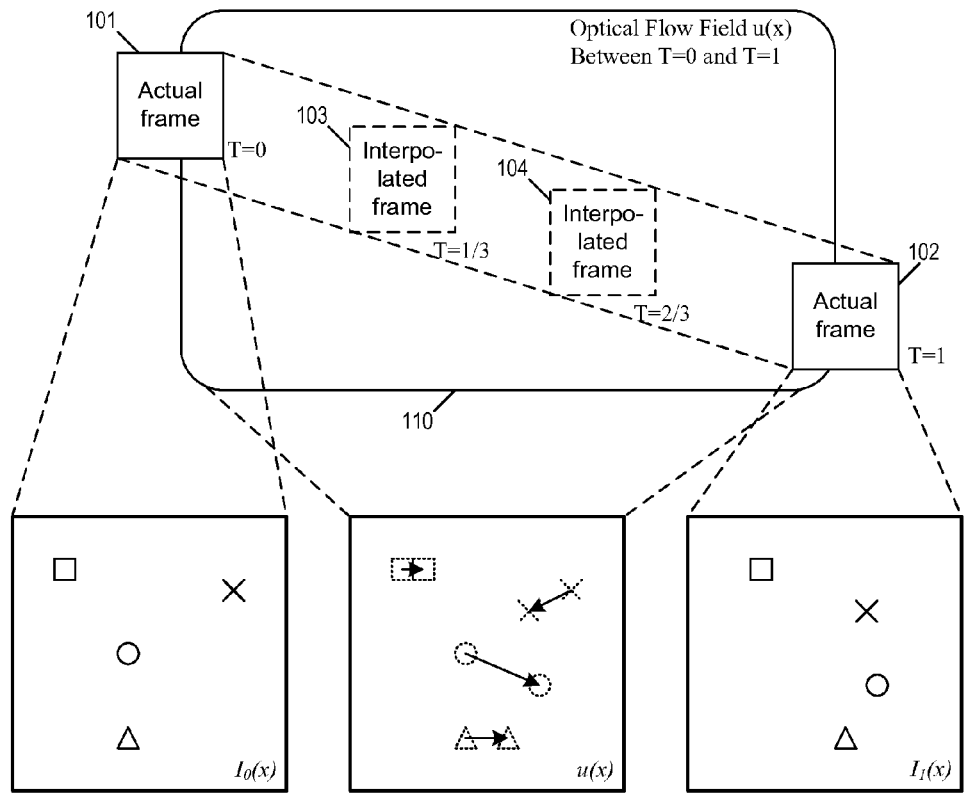
FIG. 1 illustrates using one optical flow estimate between actual frames to create synthesized frames by interpolation.
Figure 1:
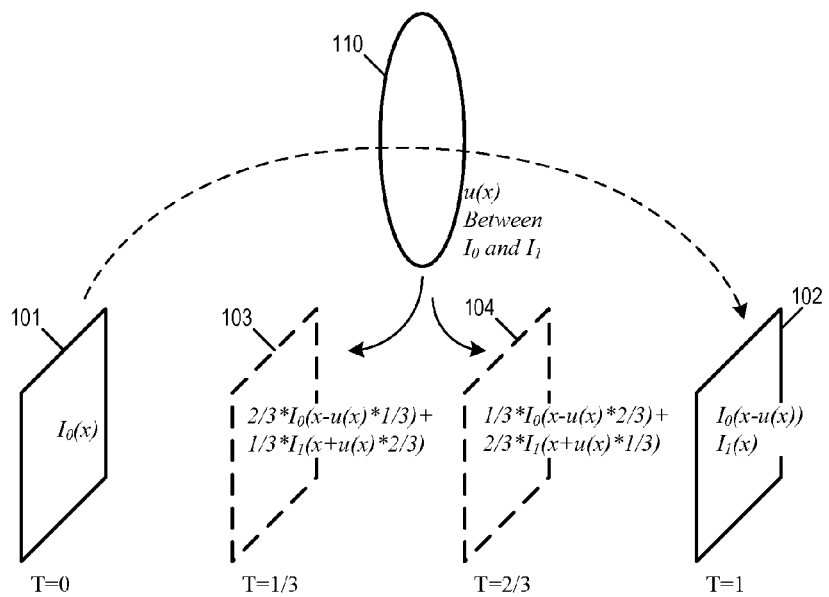

FIG. 1 illustrates two actual/recorded frames 101 and 102 for which the in-between frames are to be generated. An actual/recorded frame in a media clip is a frame that already exists in the media clip and can be a frame that is captured by a camera, or a frame that was previously created by a user or by a media editing application. The two actual frames 101-102 are consecutive frames in the media clip, i.e., there is no other actual recorded video frame in the media clip between those two frames. Each of the frames 101 and 102 is associated with its own timing instant T. For ease of illustration, the timing instants of the two actual frames are normalized to T=0 and T=1, respectively.

As illustrated, synthetic (or interpolated) frames are needed at timing instants T=⅓ and T=⅔. In some embodiments, the synthetic frames are needed at these timing instants because of a retiming operation, e.g., a retiming operation that slows the playback speed to ⅓ of its original speed. (Retiming operations will be further described below in Section II.) In some embodiments, the synthetic frames are needed because of frame rate differential between the recording device and the playback device, e.g., the playback device plays 3 times as many frames per unit time as the recording device records. These timing instants are based on the time that the actual frames are recorded in the media, hence there are also referred to as media timing instants. These timing instants in some embodiments directly reflect their playback times. In some embodiments, due to retiming operations, these timing instants would not directly reflect their playback times, but rather, a playback curve is used to map the frames' playback times to their media timing instants. The mapping of playback time to media timing instants will be described by reference to FIG. 6 below.

FIG. 1 also illustrates a flow estimate 110 between the actual frames 101 and 102 (from the actual frame 101 to the actual frame 102). $I_0(x)$ represents the pixels of the first actual frame 101, $I_1(x)$ represents the pixels of the second actual frame 102, and $u(x)$ represents the optical flow from $I_0(x)$ to $I_1(x)$. The variable x represents the spatial positions of pixels within a frame.

Numerous algorithms have been proposed for estimating the optical flow $u(x)$ from $I_0(x)$ to $I_1(x)$. For example, some embodiments use optical flow estimation method proposed by Horn and Schunk to estimate an optical flow between the two frames according to Equation (1):

$$E_{HS}(u(t+1)) = \int_\Omega (\|I_{t+1}(x+u(t+1)) - I_t\| + \alpha(|\nabla u_x(t+1)|^2 + |\nabla u_y(t+1)|^2))dxdy \quad (1)$$

In this equation, t is the time of the first actual frame (e.g., 101) and t+1 is the time of the second actual frame (e.g., 102). The algorithm solves for the flow u that minimizes E by solving the associated Euler-Lagrange equations using iterative gradient descent. Image is decomposed into a pyramid of lower resolution images. Flow is iteratively solved for at a slice of the pyramid. The next level images are warped by previous flow prior to computing the flow correction.

Other algorithms have also been proposed. For example, some embodiments use the following revised optical flow estimation algorithm proposed by Zach, Pock, and Bischof according to Equation (2):

$$E_{TV}(u(t+dt)) = \int_\Omega \Big(\|(I_{t+1}(x+(1+dt)*u(t+dt)) - I_t(x-dt*u(t+dt))\| + \alpha\sqrt{|\nabla u_x(t+dt)|^2 + |\nabla u_y(t+dt)|^2}\Big)dxdy \quad (2)$$

In this equation, t is the time of the first actual frame (e.g., 101) and t+1 is the time of the second actual frame (e.g., 102). The algorithm solves for the flow that minimizes E using a dual coupled equation decomposition of the energy equation, with an iterative gradient descent inner loop. It then uses the same pyramid scheme as previously discussed. Flow estimation can be solved for any t+dt between t and t+1.

Descriptions of Optical Flow estimation methods can be found in "Motion Compensated Frame Interpolation with a Symmetric Optical Flow Constraint" by L. Raket, L. Roholm, A. Bruhn, and J. Weickert, and "A Duality Based Approach for Realtime TV-L Optical Flow" by C. Zach, T. Pock, and H. Bischof.

Regardless of which algorithm is used to solve for estimated flow, it is a computationally intense process. Some embodiments therefore compute only a limited set of estimated flows at a limited set of time slots in order to conserve computing resources. FIG. 1 illustrates an example in which only one flow estimate 110 is computed for the actual frame pair 101 and 102. This flow estimate assumes that the optical flow at the time of the first actual frame (i.e., T=0 or t) is the same as at the time of the second actual frame (i.e., T=1 or t+1). The lone flow estimate is then used synthesize all of the necessary intermediate frames by interpolation. For some embodiments that use Horn-Schunk algorithm, this one flow estimate $u(x)$ is $u(t+1)$, i.e., the flow estimate computed at t+1 or the time of the second actual frame (i.e., normalized time T=1 for the actual frame 102). For some embodiments that use the revised flow estimation algorithm, this one flow estimate $u(x)$ is $u(t+dt)$ that is computed for when t+dt equals t+1, which is again the flow estimate computed at the time of the second actual frame.

FIG. 1 shows the creation of the synthesized frames by interpolation based on the lone estimated optical flow $u(x)$. Since this $u(x)$ is computed for when T=1, it can also be labeled as $u(x, T=1)$. The interpolation is based on the pixel data of the first actual frame $I_0(x)$, the pixel data of the second actual frame $I_1(x)$, and the estimated flow $u(x)$. The figure illustrates two synthesized (or interpolated) frames 103 and 104 at normalized times T=⅓ and ⅔, respectively.

The synthesized frame 103 is interpolated at T=⅓, whose pixel data $I_{1/3}(x)$ is computed according to:

$$I_{1/3}(x) = \tfrac{2}{3}*I_0(x-u(x)*\tfrac{1}{3}) + \tfrac{1}{3}*I_1(x+u(x)*\tfrac{2}{3})$$

The synthesized frame 104 is interpolated at T=⅔, whose pixel data $I_{2/3}(x)$ is computed according to:

$$I_{2/3}(x) = \tfrac{1}{3}*I_0(x-u(x)*\tfrac{2}{3}) + \tfrac{2}{3}*I_1(x+u(x)*\tfrac{1}{3})$$

Figure 2:
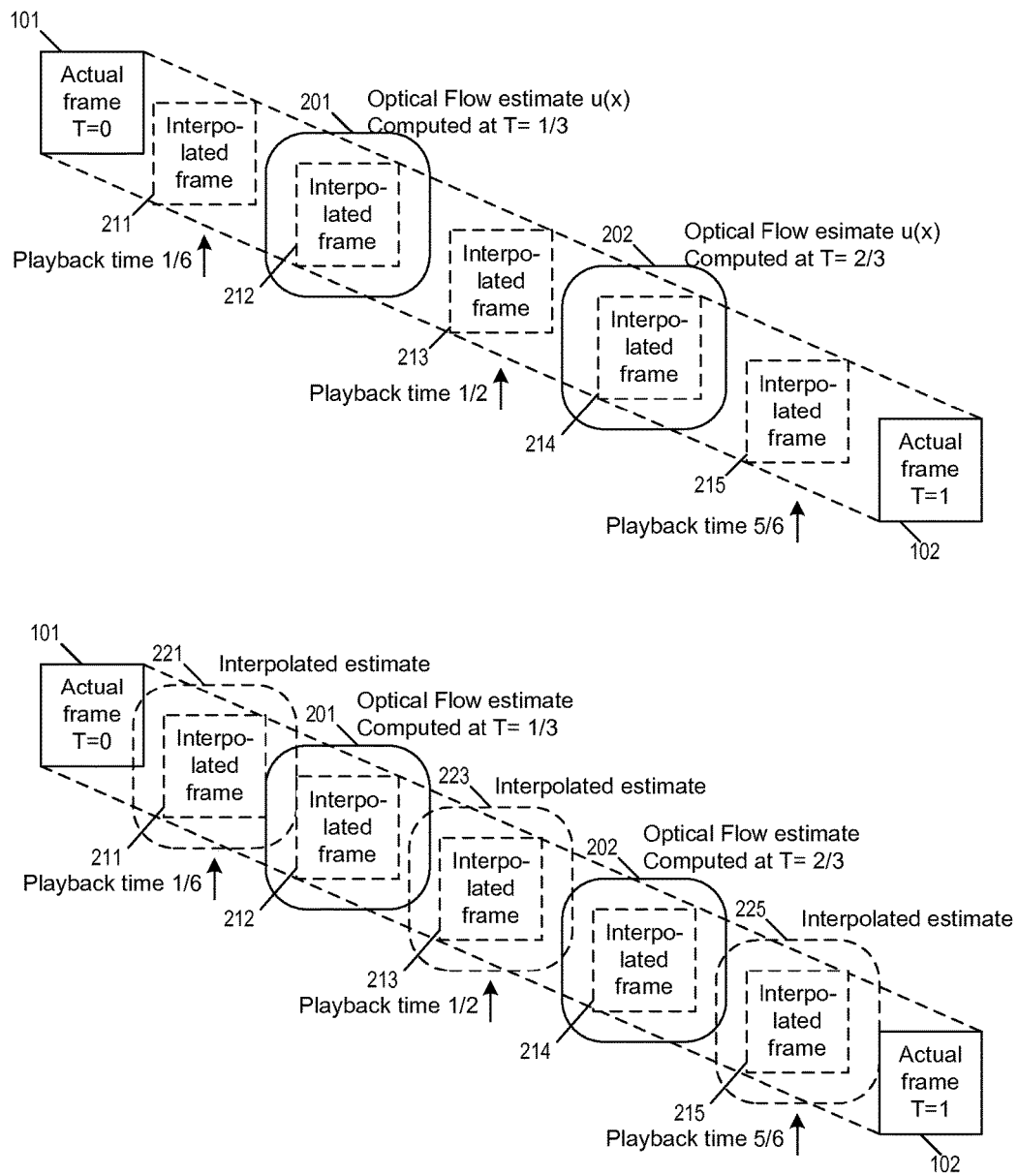
FIG. 2 illustrates computing a set of estimated optical flows at a set of different media timing instants between the two actual recorded frames.

Rather than relying on only one estimated optical field ($u(x)$ at T=1) by assuming that the optical flow at T=0 is the same as the optical flow at T=1, some embodiments computes a set of estimated optical flows at a set of different media timing instants between T=0 and T=1. FIG. 2 illustrates computing a set of estimated optical flows at a set of different media timing instants between the two actual recorded frames 101 and 102. The set of estimated optical flows are then used to compute the synthesized frames.

As illustrated, an estimated optical flow field 201 is computed for media timing instant T=1/3 and another estimated optical flow field 202 is computed for media timing instant T=2/3. The estimated optical flow fields 201 and 202 are in turn used to compute the interpolated or synthesized frames 211-215 between the two actual frames 101 and 102.

Ideally, each media timing instant that needs a synthesized frame would have an optical flow estimate computed for that instant. However, computing an estimated optical flow field is an expensive process. Some embodiments therefore compute only a limited set of estimated flows between the actual frames while using interpolation to create all of the frames necessary for playback from the limited set of estimated flows. Some embodiments compute only up to a fixed number of flow estimates per consecutive actual frame pair. This fixed number is determined in some embodiments by the availability and the capability of the computing resources. If the media playback requires more synthetic frames between the two actual frames than the fixed number, the method would not compute any more flow estimates but rather rely on interpolation to create the needed synthetic frames.

In some embodiments, the estimated flows in the set are all computed for timing instants that need synthetic/interpolated frames. This ensures that at least some of the synthetic frames are generated based on the best available optical flow estimates. In the example illustrated in FIG. 2, the estimated flows 201 and 202 are computed at timing instants T=1/3 and T=2/3. These two estimated flows are in turn used to generate the synthetic frames 212 and 214 that are for the same timing instants T=1/3 and T=2/3. Three other synthetic frames 211, 213, and 215 are not at timing instants that have their own estimated optical flow estimates. Some embodiments therefore create these other synthetic frames by interpolating from the computed flow estimates (i.e., 201 and 202).

Some embodiments perform interpolation on the computed flow estimates in order to generate interpolated flow estimates. Some embodiments compute interpolated flow estimates for each of the required timing instants and then generate synthetic frames for those required timing instants from the interpolated flow estimates. As illustrated in FIG. 2, in order to generate the synthetic frames 211, 213, and 215 respectively at media timing instant T=1/6, 1/2, and 5/6, some embodiments generate interpolated flow estimates 221, 223, and 225 at those media timing instants.

Figure 3:
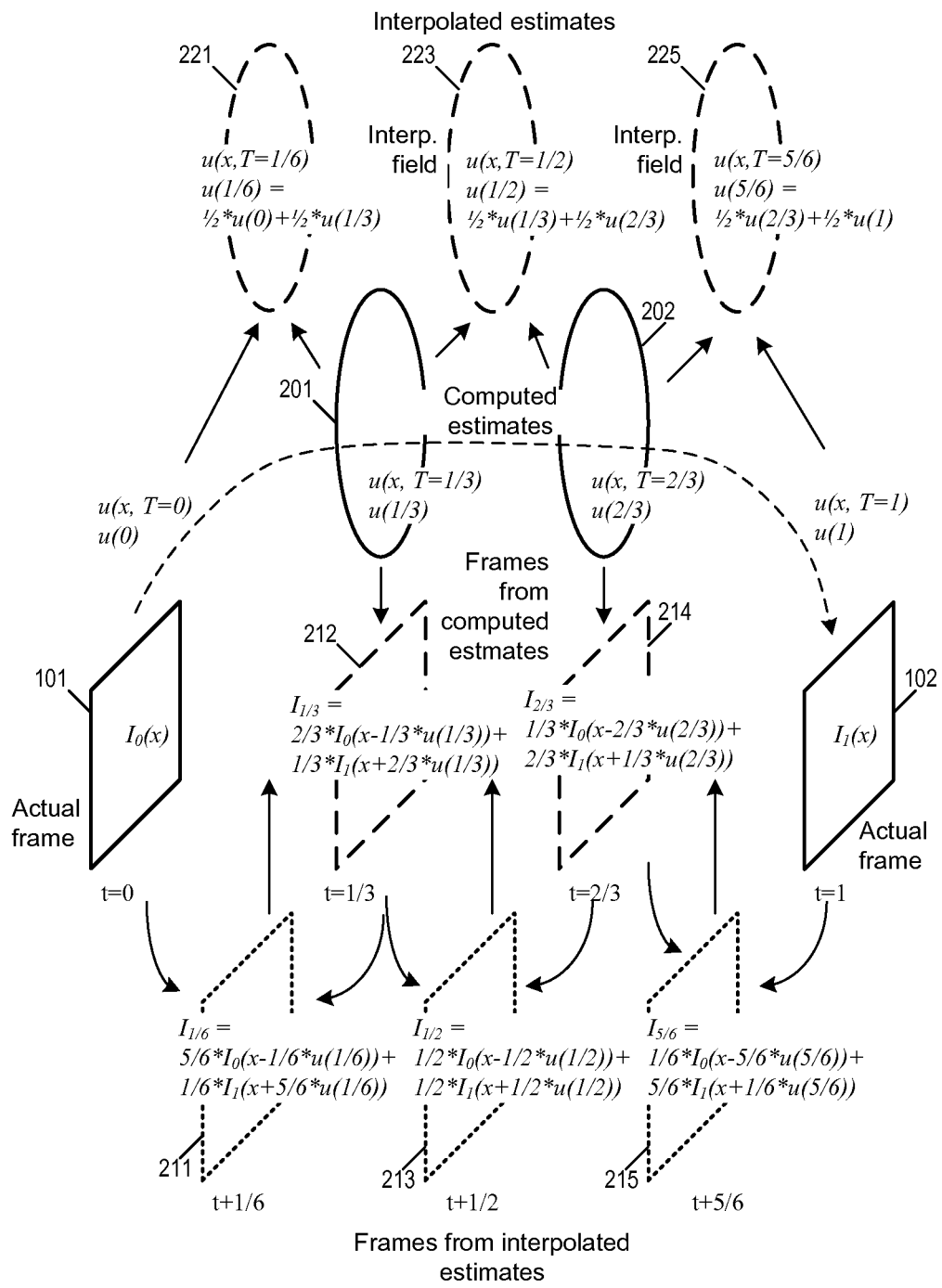
FIG. 3 illustrates the generation of interpolated flow estimates and interpolated synthetic frames from the interpolated flow estimates.

FIG. 3 illustrates the generation of interpolated flow estimates and the generation of interpolated synthetic frames from the interpolated flow estimates. Specifically, the figure illustrates the generation of the interpolated flow estimates 221, 223, 225 and the generation of the interpolated synthetic frames 211, 213, and 215. The interpolated flow estimates are generated by interpolating the computed flow estimates 201 and 202, which are in turn computed by using one of the optical estimation algorithms (e.g., Equations (1) or (2) discussed above) based on the actual recorded frames 101 and 102.

As illustrated, the computed flow estimates 201 and 202 are computed at T=1/3 and T=2/3 from the pixel data of the actual frames (denoted as $I_O(x)$ and $I_1(x)$). In some embodiments, the flow estimate at T=1/3 is the flow field u(x) computed by using Equation (2) with dt=1/3, i.e., u(dt=1/3, x); the flow estimate at T=2/3 is the flow field u(x) computed by using Equation (2) with dt=2/3, i.e., u(dt=2/3, x). For purpose of illustrative simplicity, u(dt=1/3,x) or u(T=1/3,x) is denoted as u(1/3), while u(dt=2/3,x) or u(T=2/3,x) is denoted as u(2/3). However, one of ordinary skill would understand that u(1/3), u(2/3), etc. still denote a function with respect to time t and pixel position x. Since the computed flow estimates 201 and 202 are also at the same media timing instants as the required synthetic frames 212 and 214, the synthetic frame 212 and 214 can be calculated from the computed flow estimates 201 and 202 without using any interpolated flow estimates.

The synthesized frame 212 is for T=1/3, whose pixel data $I_{1/3}(x)$ is computed according to:

$$I_{1/3} = 2/3 * I_0(x - 1/3 * u(1/3)) + 1/3 * I_1(x + 2/3 * u(1/3))$$

The synthesized frame 214 is for T=2/3, whose pixel data $I_{2/3}(x)$ is computed according to:

$$I_{2/3} = 1/3 * I_0(x - 2/3 * u(2/3)) + 2/3 * I_1(x + 1/3 * u(2/3))$$

where u(1/3) is the computed flow estimate for T=1/3 and u(2/3) is the computed flow estimate for T=2/3. As mentioned, synthetic frames are also needed for T=1/6, T=1/2, and T=5/6, but flow estimates are not computed for these media timing instants. The system therefore generates interpolated flow estimates 221, 223, and 225 for these time slots.

The interpolated flow estimate 221 is for T=1/6; it is interpolated according to:

$$u(1/6) = 1/2 * u(0) + 1/2 * u(1/3)$$

The interpolated flow estimate 223 is for T=1/2; it is interpolated according to:

$$u(1/2) = 1/2 * u(1/3) + 1/2 * u(2/3)$$

The interpolated flow estimate 225 is for T=5/6; it is interpolated according to:

$$u(5/6) = 1/2 * u(2/3) + 1/2 * u(1)$$

where u(0) is the estimated flow at T=0, while u(1) is the estimated flow at T=1. In some embodiments, u(0) is the estimated flow u(x) computed by using Equation (2) with dt=0, i.e., u(dt=0,x), while u(1) is the estimated flow u(x) computed by using Equation (2) with dt=1, i.e., u(dt=1,x). Once the interpolated flow estimates have been computed for T=1/6, T=1/2, and T=5/6, the remaining synthetic frames for those media timing instants can also be calculated.

The pixel data $I_{1/6}(x)$ for the synthetic frame 211 at T=1/6 is computed according to:

$$I_{1/6} = 5/6 * I_0(x - 1/6 * u(1/6)) + 1/6 * I_1(x + 5/6 * u(1/6))$$

The pixel data $I_{1/2}(x)$ for the synthetic frame 213 at T=1/2 is computed according to:

$$I_{1/2} = 1/2 * I_0(x - 1/2 * u(1/2)) + 1/2 * I_1(x + 1/2 * u(1/2))$$

The pixel data $I_{5/6}(x)$ for the synthetic frame 215 at T=5/6 is computed according to:

$$I_{5/6} = 1/6 * I_0(x - 5/6 * u(5/6)) + 5/6 * I_1(x + 1/6 * u(5/6))$$

With the pixel data for synthetic frames 211-215 calculated, the system is able to smoothly display the video sequence between the two actual frames 101 and 102 based on optical flow calculations.

In some embodiments such as the example illustrated in FIG. 3, the system performs the optical flow algorithm and generates the limited set of computed flow estimates at time instants that are required for playback. However, in some embodiments, the system generates computed flow estimates for time instants that are not necessarily the specified media timing instants. For example, the playback may require synthetic frames at T=⅓ and T=⅔, but the system performs the algorithm to generate the computed flow estimate only at T=½. The system would then use the computed flow estimate at T=½ to generate interpolated flow estimate for both T=⅓ and T=⅔, then use the interpolated flow estimates to generate the synthetic frames.

Figure 4:
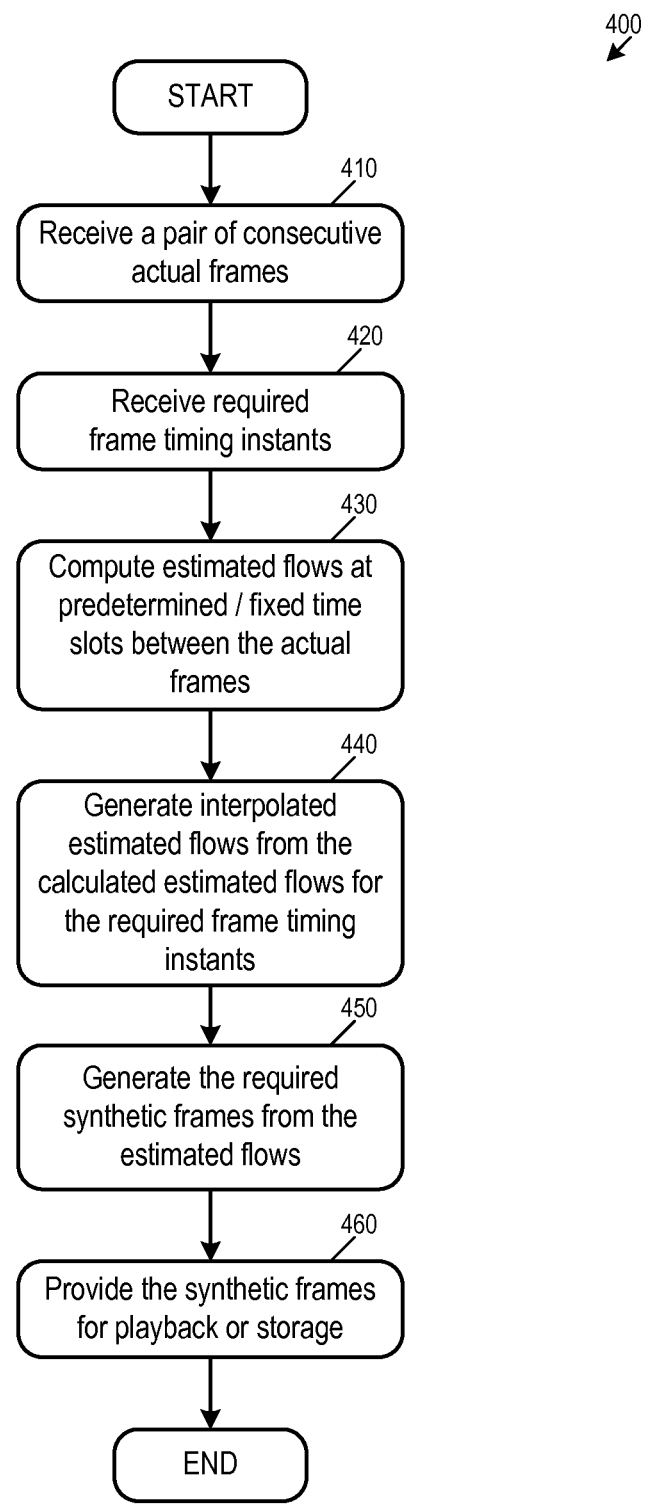
FIG. 4 conceptually illustrates a process for generating synthetic frames between actual recorded frames by using optical flow.

For some embodiments, FIG. 4 conceptually illustrates a process 400 for generating synthetic frames between actual recorded frames by using optical flow. In some embodiments, the process 400 is performed by a media editing application running on a computing device.

The process 400 starts when it receives (at 410) a pair of consecutive actual frames (e.g., 101 and 102). In some embodiments, the media editing application identifies media timing instants that need synthetic frames. Actual frame pairs that bookend these identified media timing instants are then provided to this process in order to generate the synthetic frames. The process then receives (at 420) the specification for the required media timing instant or instants. These are time slots that video data are needed for playback (by a media editing application or a video playback device).

Next, the process computes (at 430) a set of estimated optical flow fields (e.g., generating the computed flow estimates 201 and 202). In some embodiments, only a fixed number of estimated optical flow fields are computed according to one of the flow estimation algorithms (e.g., Equation (1) of Horn-Schunk or Equation (2) of Zach, Pock, and Bischof). In some embodiments, some of the estimated flows are computed for time instants that coincide with some of the received specified media timing instants. In some embodiments, the flow estimates are for time instants that do not necessarily coincide with the received specified media timing instants.

The process then generates (at 440) interpolated flow estimates at the specified media timing instants from the computed flow estimates (e.g., generating the interpolated flow estimates 221, 223, and 225). Based on the interpolated flow estimates (and the computed flow estimates in some embodiments), the process generates the interpolated/synthetic frames for the specified timing instants (e.g., synthetic frames 211-215 from flow estimates 221, 201, 223, 202, and 225, respectively).

After providing (at 460) the generated synthetic/interpolated frames for playback or storage, the process 400 ends.

II. Video System for Retiming

As mentioned, in some embodiments, optical flow is used by a media editing application that performs retiming. The retiming operation changes the playback timing of a media content so that synthetic video frames are needed at certain timing instants for smooth playback. Such a media editing application in some embodiments executes on computing device that implements a video system.

Figure 5:
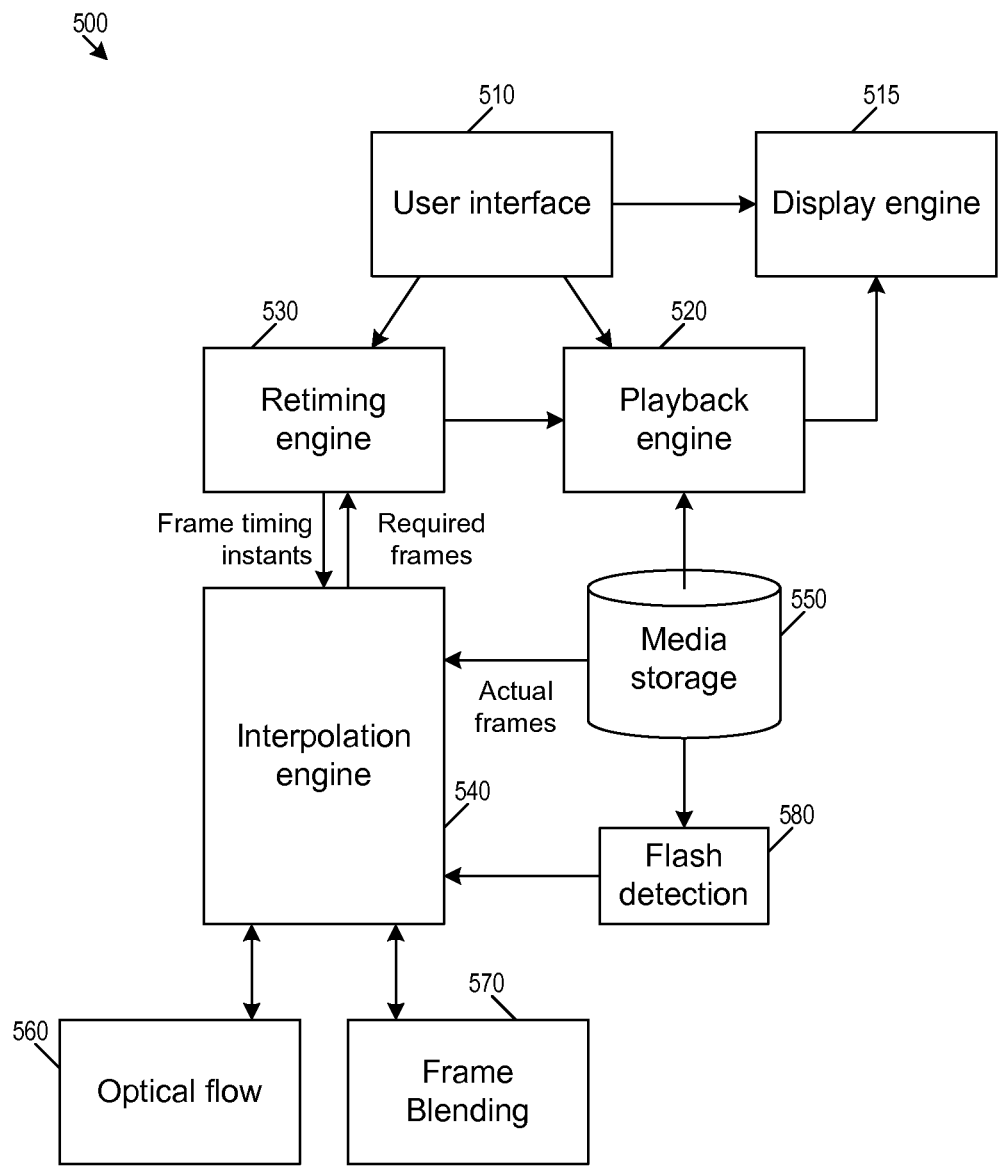
FIG. 5 illustrates a video system that performs retiming and uses optical flow to create the requisite in-between synthetic video frames for smooth playback.

For some embodiments, FIG. 5 illustrates a video system 500 that performs retiming and uses optical flow to create the requisite in-between synthetic video frames for smooth playback. As illustrated, the video system includes a user interface module 510, a display engine 515, a playback engine 520, a retiming engine 530, an interpolation engine 540, and a media content storage 550. In some embodiments, these various modules or engines are software modules performed by or controlled by a media editing application.

The user interface module 510 receives user commands and controls the editing, the playback, and the display of media contents based on the received user command. The user commands can be derived from user input devices such as keyboard, mouse, touchscreen, or any other device or methods that allows user to manipulate media content, to initiate playback, or to introduce any other user command or data. In some embodiments, the user interface 510 provides a graphical user interface (GUI) that displays user selectable or movable graphical items to facilitate user input. The user interface 510 communicates with the display engine 515, the playback engine 520, and the retiming engine 530. The display engine 515 handles the display to the user through a display device such as a computer monitor or a touchscreen. Part of that display is supplied by the playback engine 520, which sequence through frames in a media content. The playback engine 520 can play back frames from the original media content stored in the media storage 550, or frames from the retimed media content provided by the retiming engine 530.

The retiming engine 530 receives retiming commands from the user interface module 510. In some embodiments, the retiming commands are media editing commands that changes playback timing of a piece of media. In some embodiments, such retiming commands include fast forward, slow motion, reverse, pause, conforming frame rate, etc. Examples of retiming operations are provided in U.S. Patent Application Publication No. 2012/0210228 and U.S. Patent Application Publication No. 2014/0169765. U.S. Patent Application Publication No. 2012/0210228 and U.S. Patent Application Publication No. 2014/0169765 are hereby incorporated by reference.

The retiming engine 530 determines or identifies the media timing instants for which video frames are needed. The identification of media timing instants that need synthetic video frames will be further described below by reference to FIG. 6. The identified media timing instants are specified and provided to the video frame interpolation engine 540, which provides the frames that correspond to the identified media timing instants. Depending on the identified media timing instants, these frames can be actual frames retrieved from the media storage 550, or interpolated/synthetic frames generated by the interpolation engine 540 for the identified media timing instants.

The interpolation engine 540 retrieves actual recorded frames from the media storage 550 and the identified media timing instants from the retiming engine 530. It in turn provides the necessary video frames for those identified media timing instants and to generate synthetic frames when necessary, e.g., when an identified media timing instant does not have a corresponding actual frame in the media storage 550.

In some embodiments, the interpolation engine 540 is capable of using multiple different methods to generate the synthetic frames. Some of the methods are optical flow based techniques as described above in Section I. Other non-optical flow based video frame interpolation techniques such as frame blending are also used. In some embodiments, the interpolation detects events in the video such as flash or scene change in order to determine which technique to use. Specifically, in some embodiments, the interpolation engine 540 detects whether there is sudden change in luma intensity in the video in order to decide whether to use optical flow or to use frame blending. Switching between optical-flow-based frame interpolation and non-optical-flow-based frame interpolation based on flash detection will be further described in Section III below.

As illustrated, the interpolation engine 540 receives input from a flash detection engine 580, which informs the interpolation engine of a detected flash event. The interpolation engine 540 then uses the detection result to decide whether to use an optical flow engine 560 or to use a frame blending engine 570 for generating the synthetic/interpolated frames. Though FIG. 5 illustrates the optical flow engine 560, the frame blending engine 570, and the flash detection 580 as separate modules outside of the interpolation engine 540, in some embodiments, some or all these modules are part of the interpolation engine 540.

Figure 6:
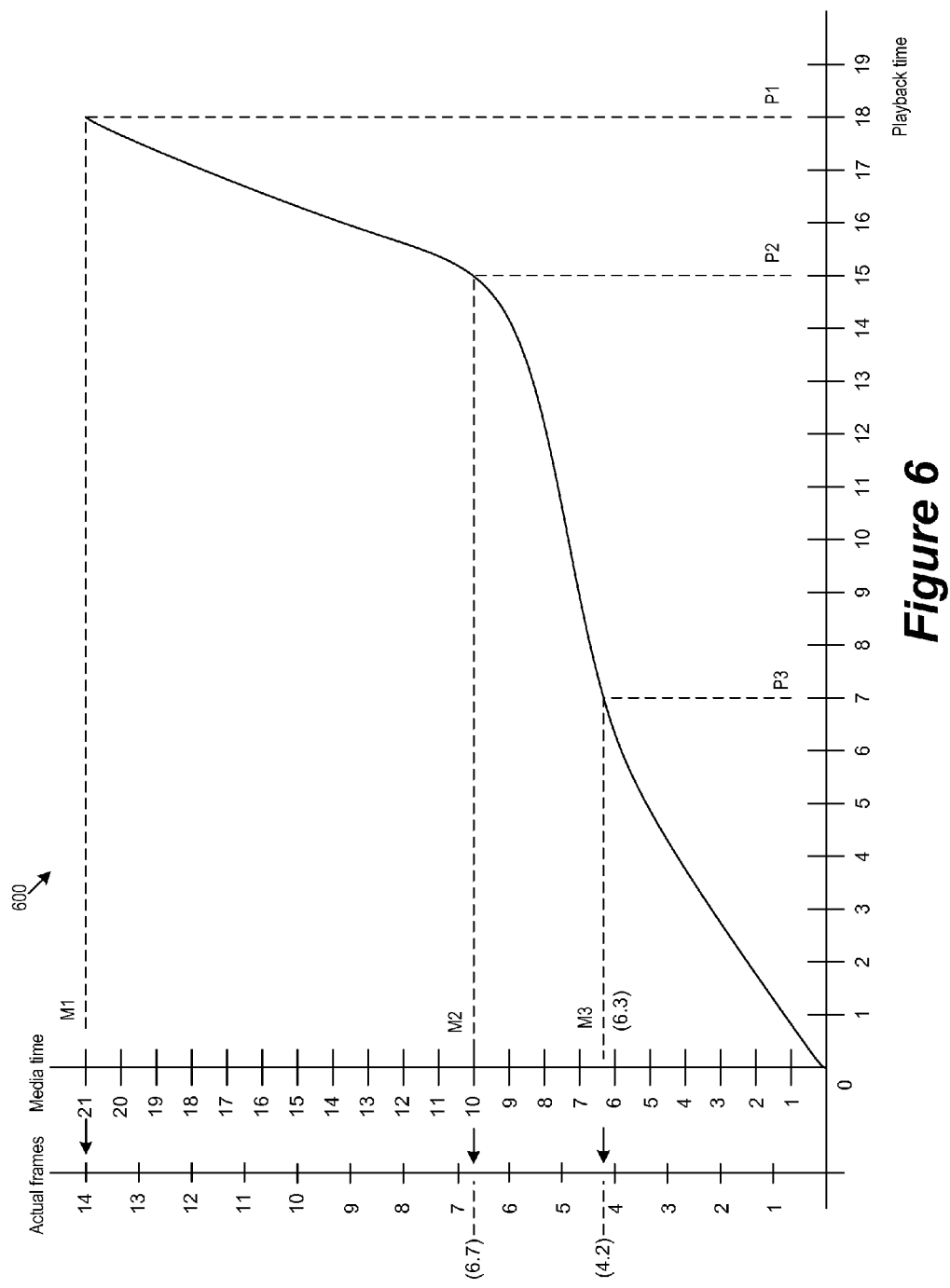
FIG. 6 illustrates retiming and the identification of media timing instants that needs interpolated/synthetic frames.

FIG. 6 illustrates retiming and the identification of media timing instants that needs interpolated/synthetic frames. FIG. 6 illustrates a playback curve 600, which describes the relationship between the original media content and the retimed playback. The horizontal axis represents playback time, while the vertical axis represents media time. Playback time is the time specified and required by a playback application or a display device. Media time is the time that the media content is originally recorded at. Each integer value in the playback time axis corresponds to a playback time that a frame is scheduled to be displayed or needed for display (e.g., because the display device is scheduled to display a frame at that instant of time). For example, according to the playback curve 600, at the playback time 15 (P2), the media content associated with media time 10 (M2) is scheduled to be displayed, while at playback time 18 (P1), the media content associated with media time 21 (M1) is scheduled to be displayed.

The illustrated playback curve 600 does not have a linear relationship between the playback time and the media time. This can be because the playback curve of the video or media clip has went through retiming operations, which changes the relationship between media time and playback time. For example, the playback times of the actual frames in the original media content have been shifted by the retiming operations. In some embodiments, prior to any retiming operations, the playback curve of a media is linear because the playback time would be the same as the media time.

As mentioned, FIG. 6 also illustrates the identification of playback times that needs interpolated/synthetic frames. The figure illustrates a second vertical axis for actual frame instants in addition to the axis for media time. Each integer notch corresponds to an actual frame that is recorded at a corresponding media times. For example, the actual frame 10 is recorded at media time 15, and the actual frame 12 is recorded at media 18. However, there is no actual frame for non-integer values of actual frame instants (e.g., there are no actual frames at media timing instants 4.2 between 4 and 5, and there are no actual frames at frame instants 6.7 between 6 and 7).

In some embodiments, when a playback time does not land on media time that has a corresponding actual recorded frame, the system would generate a corresponding interpolated or synthetic frame. For example, a video frame is needed at playback time 7 (P3). This playback time is mapped to media time 6.3 according to the playback curve 600. Media time 6.3 does not have a corresponding recorded actual frame. Rather, it is mapped to a time slot that is two-tenth of the way between frame 4 and frame 5, i.e., the frame instant 4.2. This frame instant 4.2 (or media time 6.3) is thus identified as a frame instant that needs a video frame for playback, whether an actual frame or a synthetic frame. Since there is no actual recorded frame at media frame instant 4.2, an interpolated or synthetic frame will have to be generated using optical flow techniques such as those described in Section I, or other frame interpolation techniques. Conversely, when a playback time does land on a media time already has an actual frame (for example, playback time 18 mapped to media time 21 and frame instant 14), a synthetic frame will not be generated for that media time.

In some embodiments, when one or more media timing instants (whether specified as actual frame instants or media time) are identified as needing a video frame for playback, consecutive actual frame pairs that bookend those media timing instants are supplied, along with the identified media timing instants to the interpolation engine for generating the needed interpolated/synthetic frames. For example, since frame instant 4.2 is identified as a media timing instant that needs a synthetic frame, actual frames 4 and 5 are identified for the interpolation operation as they are consecutive actual frame pair that bookends the identified media timing instant.

Figure 7:
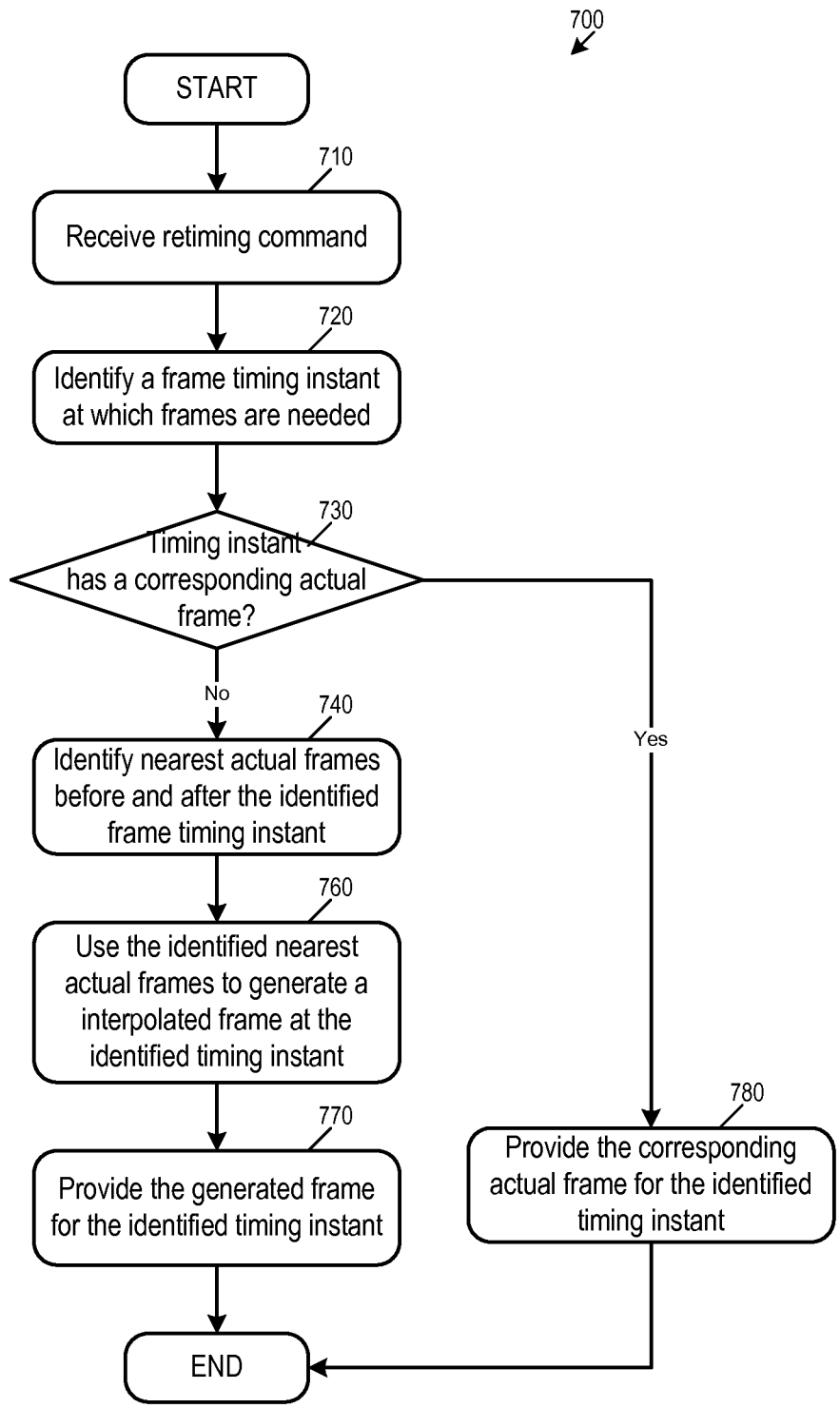
FIG. 7 conceptually illustrates a process that provides video frames for playback (or storage) when the playback requires video frames at timing instants that may or may not have a corresponding actual frame.

For some embodiments, FIG. 7 conceptually illustrates a process 700 that provides video frames for playback (or storage) when the playback requires video frames at media timing instants that may or may not have a corresponding actual frame. In some embodiments, this process is performed when the system needs to playback a piece of retimed media clip. In some embodiments, a retiming command alters the relationship between playback time and media time as discussed above by reference to FIG. 6 such that there are playback times for which a video frame is needed for playback yet there is no corresponding actual frame. In a media editing application that employs the video system 500, the process 500 is performed at the retiming engine 530 and the interpolation engine 540.

The process starts when it receives (at 710) a retiming command. The process then identifies (at 720) a media timing instant at which a frame is needed based on the altered relationship between the playback time and media time. Next, the process determines (at 720) whether the identified media timing instant has a corresponding actual frame. If there is a corresponding actual frame for the identified timing instant, the process provides (at 780) the corresponding actual recorded frame as the required video frame and ends. If the identified media timing instant has no corresponding actual frame the process proceeds to 740.

At 740, the process identifies the actual frames that are nearest to the identified media timing instant, i.e., the pair of consecutive actual frames that bookends the identified media timing instant. The process then uses (at 760) the identified nearest actual frames to generate an interpolated/synthetic frame for the identified timing instant. The process then provides (at 770) the generated interpolated/synthetic frame as the required video frame and ends.

III. Flash Detection

Optical flow is known to provide very high quality synthetic frames, regardless of its computation cost. However, there are events in a video sequence that would cause optical flow based frame interpolation to work poorly, say, in comparison with other frame interpolation techniques. For example, it is known that a video sequence that includes a sudden change or surge in light intensity (e.g., a camera flash going off or a scene change) would cause optical flow generated frames to appear distorted. Some embodiments therefore detect events in a video sequence that causes such distortions and switch off optical flow based frame interpolation.

Figure 8:
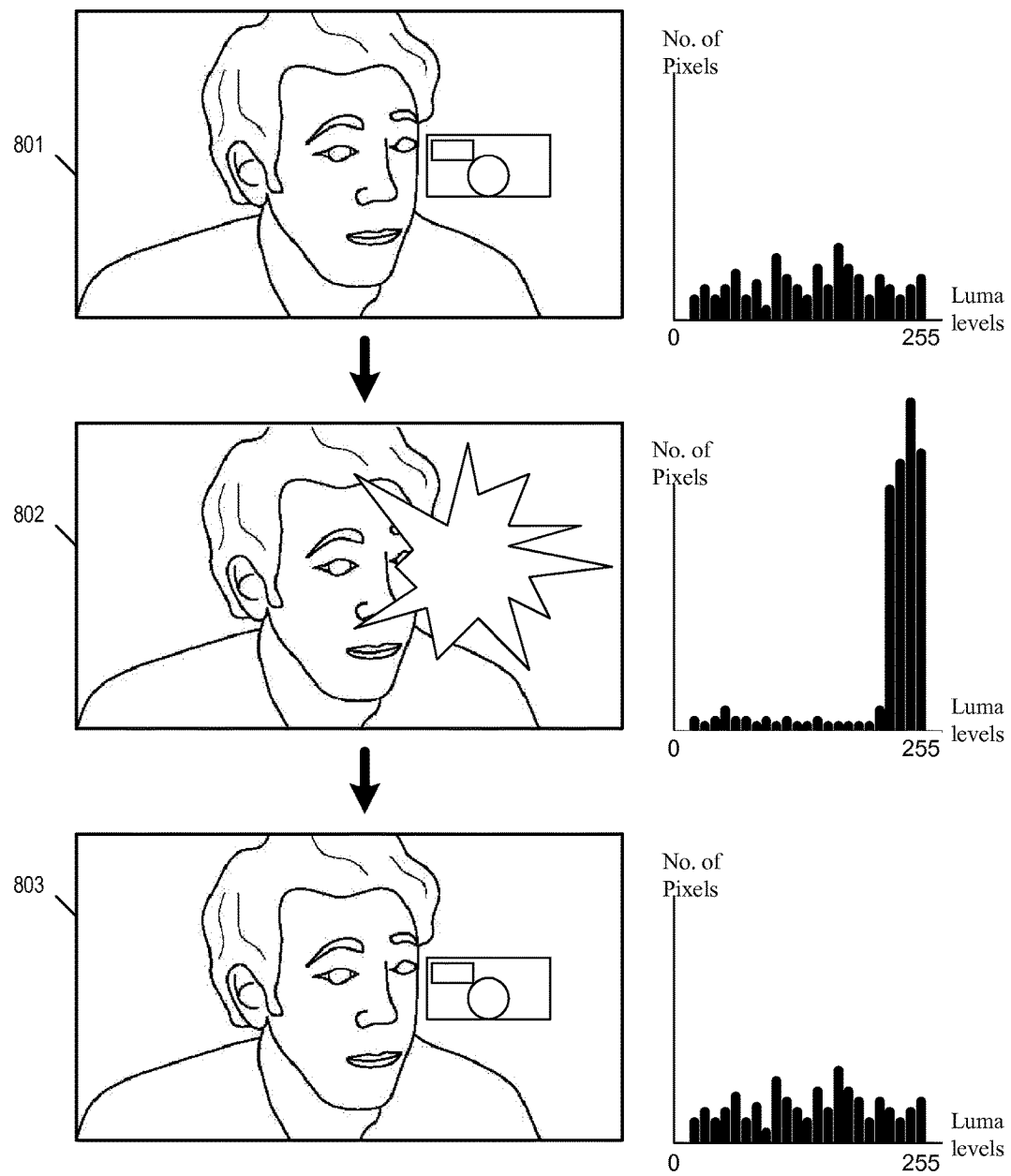
FIG. 8 illustrates a video sequence that includes a surge in light intensity which could cause distortion in optical flow computation.

FIG. 8 illustrates a video sequence that includes a sudden change in light intensity which could cause distortion in optical flow computation. The figure illustrates a sequence of (actual recorded) frames 801-803. The figure also conceptually illustrates a histogram of luma levels or intensity levels for each frame. Each histogram tallies the number of pixels (or other types of video units such as a macroblocks) for each of the possible luma or light intensity levels. In the example illustrated in FIG. 8, a pixel can have a luma value between 0 and 255, so the histogram tallies the number of pixels for each of the possible luma values between 0 and 255.

As illustrated, the frame 801 is image of a man with a camera in the background. The corresponding histogram of the frame 801 shows a fairly even distribution of pixels across the different luma levels. The frame 802 shows a surge of light intensity due to the flash of the camera going off. The corresponding histogram of the frame 802 shows a large increase in the numbers of pixels for high intensity levels while the numbers of pixels for low intensity levels decrease. The frame 803 shows flash subsiding and the luma intensity levels of the video returning to normal. The corresponding histogram of the frame likewise returns to a fairly even distribution of pixels across different luma levels.

The sudden surge in light intensity from the frame 801 to the frame 802 would cause the synthetic frames generated by optical flow between the actual frames 801 and 802 to appear distorted. Likewise, the sudden drop off in light intensity from the frame 802 to the frame 803 would cause the synthetic frames generated by optical flow between the actual frames 802 and 803 to appear distorted.

In some embodiments, the video system detects the sudden changes in light intensity and switch to non-optical flow based frame interpolation when such sudden change is detected. When there is no such drastic change in light intensity, the system reverts back to using optical flow frame interpolation. Specifically, some embodiments detect a flash event by computing a sum of differences in histograms of intensity levels between the pair consecutive actual video frames. When the sum of differences is above a certain threshold, the video system switch to non-optical flow based frame interpolation. When the sum of differences is below the threshold, the video system reverts back to optical flow frame interpolation.

Figure 9:
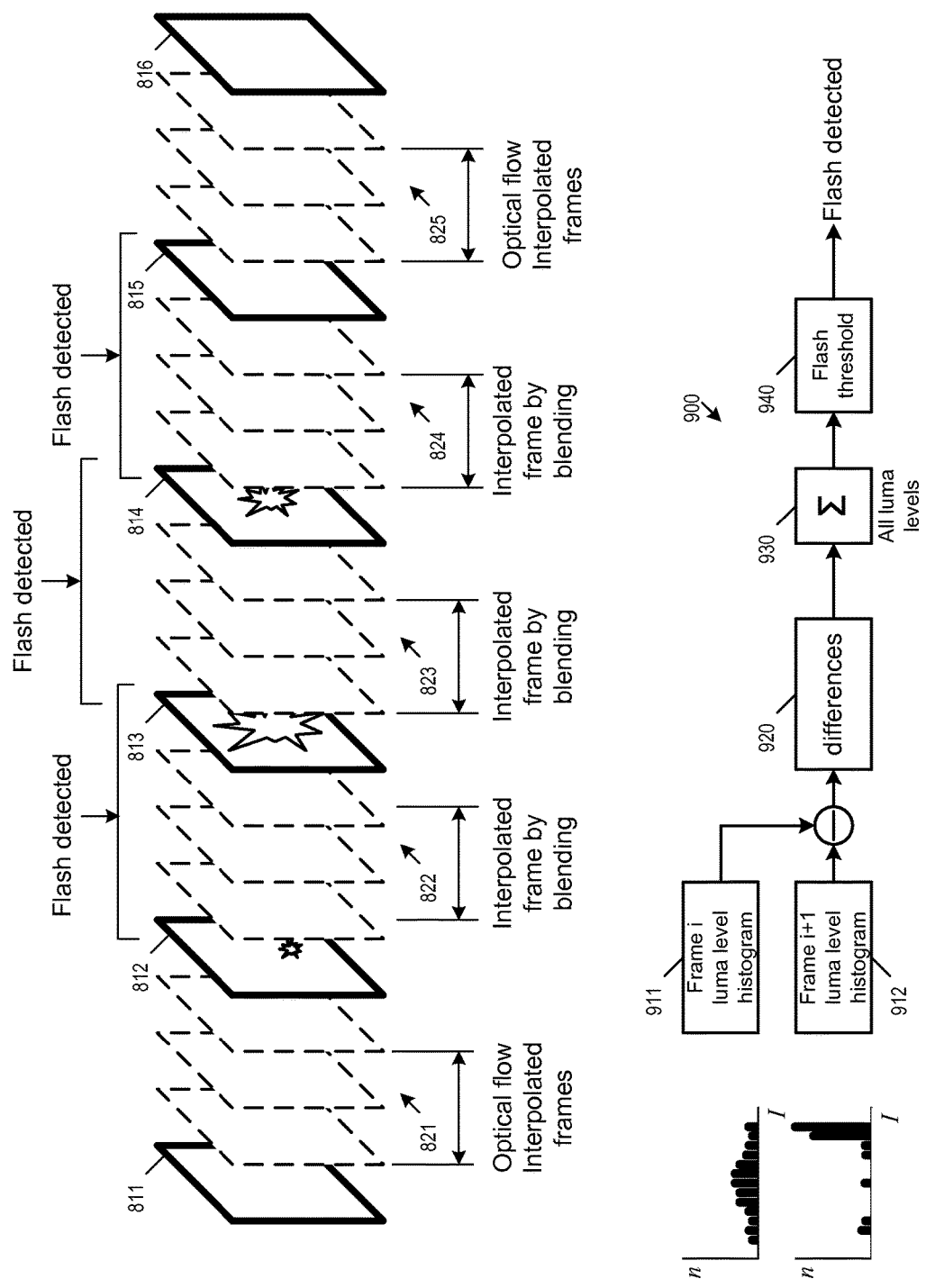
FIG. 9 illustrates a video system that detects sudden changes in luma intensities in order decide whether to use optical flow frame interpolation.

FIG. 9 illustrates a video system 900 that detects sudden changes in luma intensities in order decide whether to use optical flow frame interpolation. As illustrated, the system 900 receives the histogram of luma intensities (i.e., statistical tally of numbers of pixels for different luma intensity levels or values) of two consecutive actual frames 911 and 912. The system then computes the differences (at 920) in number of pixels between the two frames for each of the luma intensity levels. The (absolute values of) the differences of the different luma intensity levels are summed together (at 930). The system then determines (at 940) whether the sum of differences is greater than a threshold value. In some embodiments, if the sum of difference is greater than the threshold, an event that would disrupt or distort optical flow frame interpolation (e.g., flash or a scene change) is considered to have been detected.

For some embodiments, this optical flow distorting event detection operation between frame i and frame i+1 can be expressed as:

$$\sum_{I=0}^{255} |n_{i+1}(I) - n_i(I)| > \text{threshold}$$

I is luma intensity level, which ranges from 0 to 255; n(I) is the number of pixels having the luma intensity level I.

FIG. 9 also illustrates using flash detection (or other events that interrupts optical flow frame interpolation) to select either optical flow frame interpolation or other methods of frame interpolation. The figure illustrates a sequence of actual recorded frames 811-816. The system generates synthetic frames between the actual recorded frames.

Between the recorded frames 811 and 812, no flash was detected (i.e., the sum of differences in intensity between 811 and 812 does not exceed threshold), hence optical flow is used to generate the synthetic frames 821 between the actual frames 811 and 812. Likewise, no flash event was detected between the actual frames 815 and 816 and the synthetic frames 825 are generated by using optical flow.

However, flash event was detected between the actual frames 812 and 813 (i.e., the sum of differences in intensity between 812 and 813 does exceed threshold), hence optical flow is not used to generate the synthetic frames 822 between the actual frames 812 and 813. In some embodiments, the synthetic frames are generated by using frame blending. Likewise, flash events are detected between actual frames 813 and 814, as well as between 814 and 815. Consequently, the synthetic frames 823 and 824 are also generated by a non-optical flow frame interpolation technique.

Figure 10:
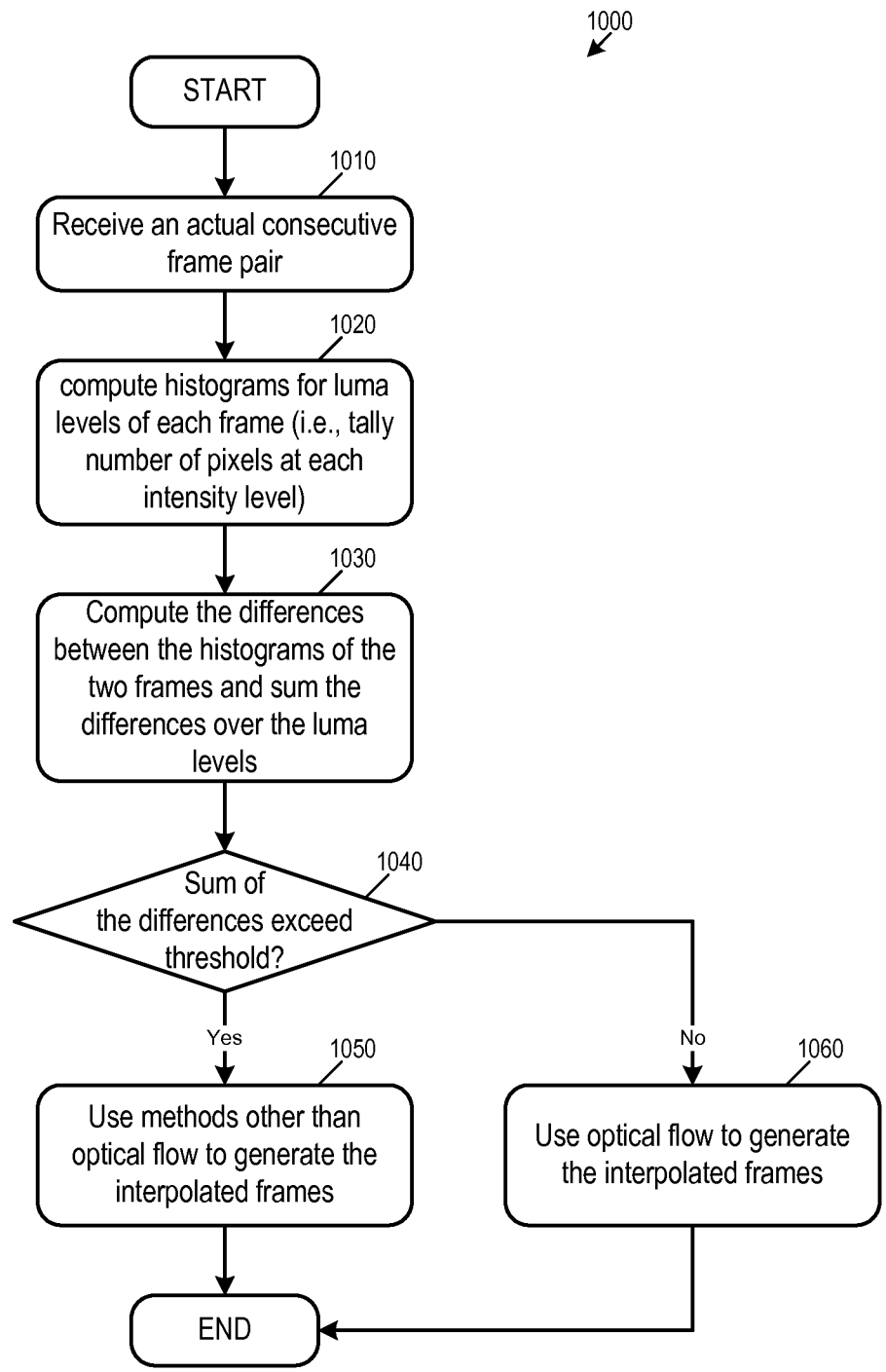
FIG. 10 conceptually illustrates a process for detecting sudden changes in luma intensity in order to avoid generating synthetic frames that appear distorted.

FIG. 10 conceptually illustrates a process 1000 for using optical flow to create synthetic frames while avoiding distortions caused by sudden changes in luma intensity. In some embodiments, the process 1000 is performed by the interpolation module 540 when using the flash detection module 580 to detect flash event and to select either optical flow interpolation 560 or frame blending 570 for generating synthetic frames.

The process 1000 starts when it receives (at 1010) an actual consecutive frame pair. It then computes (at 1020) histograms for luma levels of each frame by tallying the number of pixels for each luma intensity level. The process then computes (at 1030) the differences between the histograms of the two frames and sums (the absolute values of) differences over the range of luma levels. The computation of the sum of differences is described above by reference to FIG. 9.

The process then determines (at 1040) if the sum of the differences exceeds a certain threshold. If so, the process proceeds to 1050 to use methods that are not based on optical flow to generate the synthetic frames. If the sum of differences does not exceed threshold, the process proceeds to 1060 to use optical flow based method to generate the interpolated games. In some embodiments, the synthetic frames are generated by using the optical flow based methods described in Section I above. Whether the synthetic frames are generated by using optical flow, frame blending, or some other methods, some embodiments rely on a process similar to the process 700 to identify media timing instants that needs a synthetic frame.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
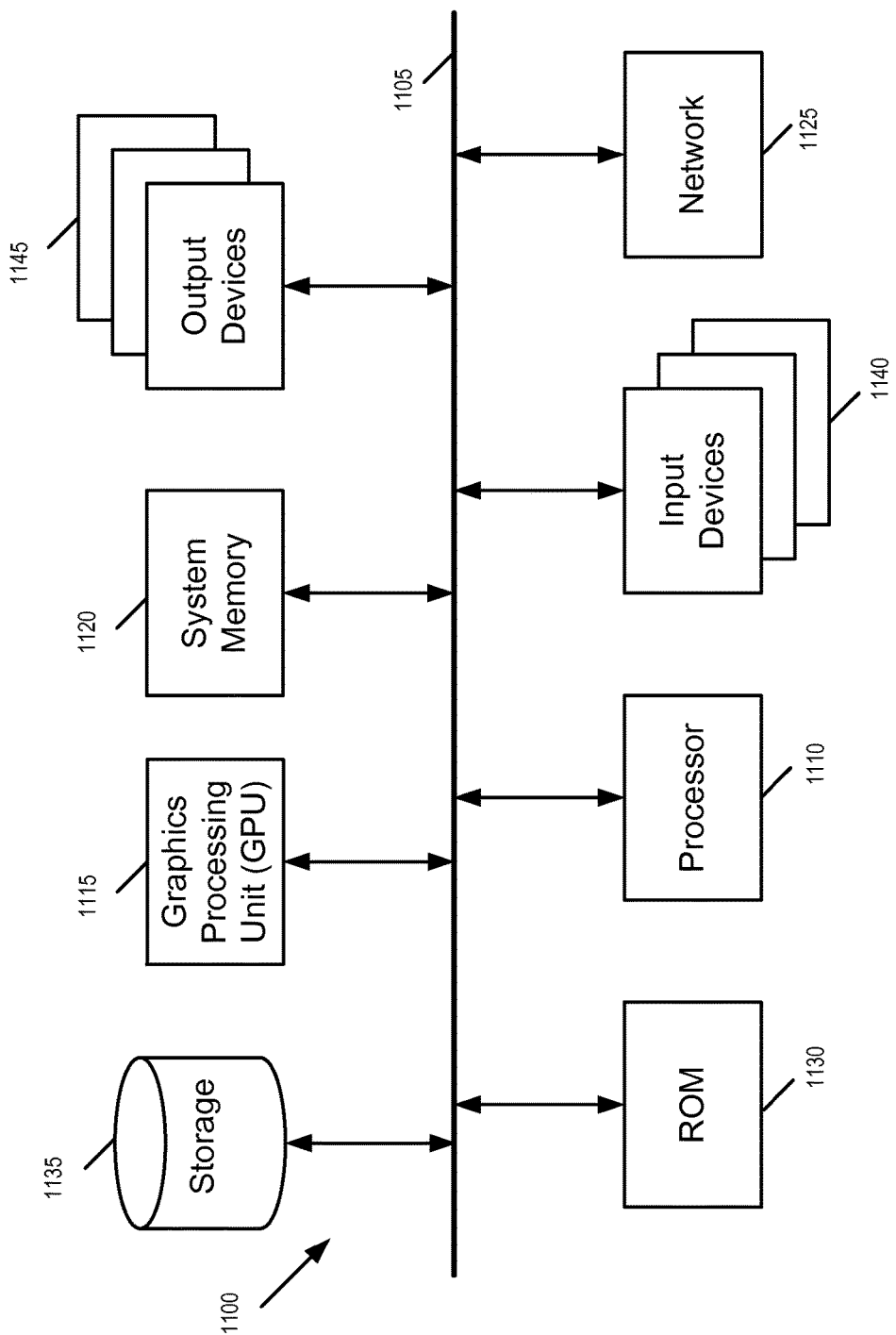
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people.

For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 7, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of processing media content, the method comprising:
   receiving first and second video frames of a media content, the first video frame associated with a first timing instant and the second video frame associated with a second timing instant;
   receiving a retiming request identifying a first set of timing instants that a video frame is scheduled to be displayed during a playback of the media content;
   computing a set of optical flow estimates between the first video frame and the second video frame, each optical flow estimate computed at a timing instant in a second set of timing instants between the first timing instant and the second timing instant; and
   computing a set of synthetic frames between the first video frame and the second video frame, each synthetic frame interpolated at a timing instant identified by the first set of timing instants between the first and second timing instants by using the set of computed optical flow estimates.

2. The method of claim 1, wherein computing a synthetic frame at a particular timing instant comprises computing an interpolated optical field that is interpolated from the set of computed optical flow estimates at the particular timing instant.

3. The method of claim 1, wherein the first and second video frames are consecutive video frames in the media content.

4. The method of claim 1, wherein a number of timing instances in the second set of timing instants is a fixed number selected based on availability of computing resources.

5. The method of claim 1, wherein the timing request comprises a request for one of fast forward, slow motion, reverse, pause, and conforming frame rate during the playback of the media content.

6. The method of claim 1, wherein each of the first set of timing instants is also a timing instant for which the media content does not have a corresponding actual frame.

7. The method of claim 1, wherein the first set of timing instants is different from the second set of timing instants.

8. The method of claim 1, wherein a number of computed optical flow fields is less than a number of synthetic frames between the first and second video frames.

9. The method of claim 1, wherein the second set of timing instants is a subset of the first set of timing instants, wherein computing the set of optical flow estimates comprises:
   computing a first set of optical flow estimates at each of the second set of timing instants using an optical flow estimating algorithm; and
   interpolating, based on the computed first set of optical flow estimates, a second set of optical flow estimates at each of a third set of timing instants, the third set of timing instants comprising every timing instant that is in the first set of timing instant sand not in the second set of timing instants.

10. An apparatus comprising:
    a set of processing units;
    a non-transitory machine readable medium storing a program for processing media content, the program executable by at least one of the processing units, the program comprising sets of instructions for:
      receiving first and second video frames of a media content, the first video frame associated with a first timing instant and the second video frame associated with a second timing instant;
      receiving a retiming request identifying a first set of timing instants that a video frame is scheduled to be displayed during a playback of the media content;
      computing a set of optical flow estimates between the first video frame and the second video frame, each optical flow estimate computed at a timing instant in a second set of timing instants between the first time-slot timing instant and the second playback slot timing instant; and
      computing a set of synthetic frames between the first video frame and the second video frame, each synthetic frame interpolated at a timing instant identified by the first set of timing instants between the first and second timing instants by using the set of computed optical flow estimates; and
    a display device for displaying the set of synthetic frames.

11. The apparatus of claim 10, wherein the set of instructions for computing a synthetic frame at a particular timing instant comprises a set of instructions for computing an interpolated optical field that is interpolated from the set of computed optical flow estimates at the particular timing instant.

12. The apparatus of claim 10, wherein the first and second video frames are consecutive video frames in the media content.

13. The apparatus of claim 10, wherein a number of timing instances in the second set of timing instants is a fixed number selected based on availability of computing resources.

14. The apparatus of claim 10, wherein the retiming request comprises a request for one of fast forward, slow motion, reverse, pause, and conforming frame rate during the playback of the media content.

15. The apparatus of claim 10, wherein each of the first set of timing instants is an instant that the display device is scheduled to display a video frame but the media content does not have a corresponding actual frame.

16. The apparatus of claim 10, wherein the first set of timing instants is different from the second set of timing instants.

17. The apparatus of claim 10, wherein a number of computed optical fields is less than a number of synthetic frames between the first and second video frames.

18. The apparatus of claim 10, wherein the second set of timing instants is a subset of the first set of timing instants, wherein the set of instructions for computing the set of optical flow estimates comprises sets of instructions for:
  computing a first set of optical flow estimates at each of the second set of timing instants using an optical flow estimating algorithm; and
  interpolating, based on the computed first set of optical flow estimates, a second set of optical flow estimates at each of a third set of timing instants comprising every timing instant that is in the first set of timing instants and not in the second set of timing instants.

19. An apparatus comprising:
  a set of processing units;
  a non-transitory machine readable medium storing a program for processing media content, the program executable by at least one of the processing units, the program comprising:
  a retiming engine for:
    receiving a retiming request; and
    specifying a first set of timing instants that a video frame is scheduled to be displayed during a playback of the media content;
  an interpolation engine for:
    computing a first set of optical flow estimates at each of a second set of timing instants using an optical flow estimating algorithm, the second set of timing instants a subset of the first set of timing instants; and
    interpolating, based on the computed first set of optical flow estimates, a second set of optical flow estimates at each of a third set of timing instants, the third set of timing instants comprising every timing instant that is in the first set of timing instants and not in the second set of timing instants; and
    generating a set synthetic frames based on the second interpolated set of optical flow estimates; and
  a playback engine for playing back the synthetic frames.

20. The apparatus of claim 19, wherein the retiming engine is part of a media editing application.

21. The apparatus of claim 19, wherein a number of the first set of computed optical flow estimates is less than a number of the second set of interpolated optical flow estimates.

* * * * *